United States Patent Office 3,280,567
Patented Oct. 25, 1966

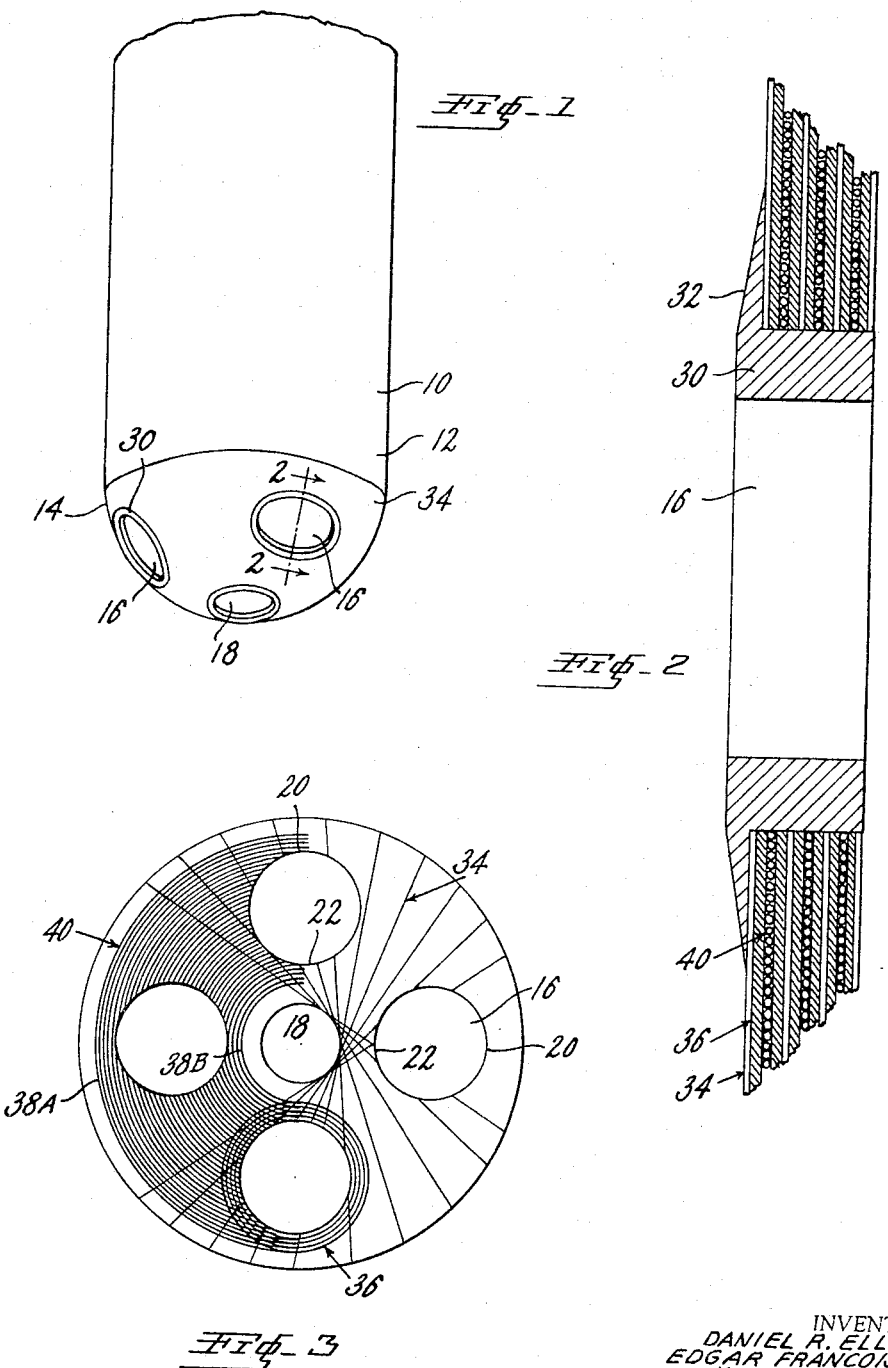

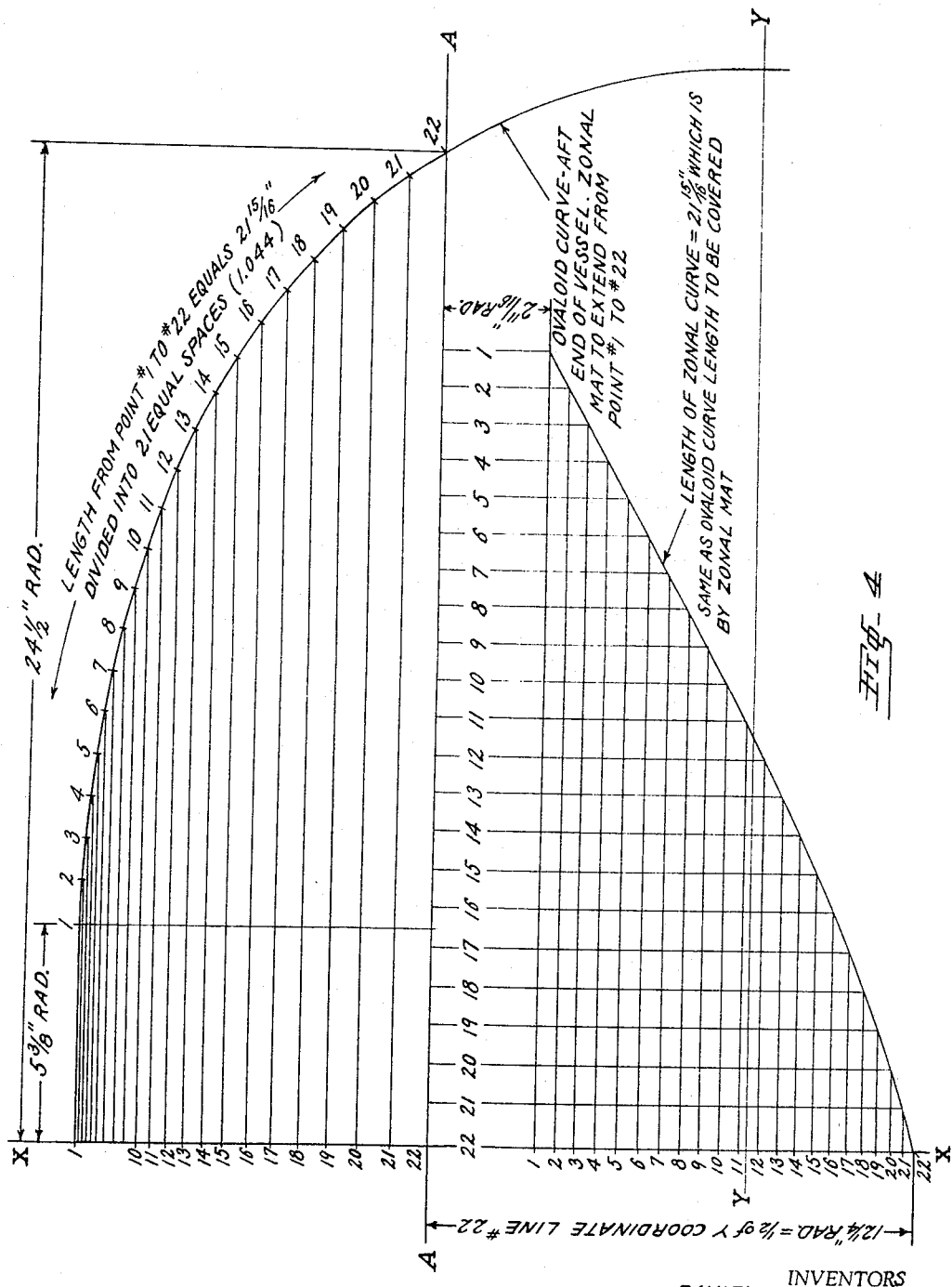

3,280,567
REINFORCED OFF-AXIS CHAMBER PORTS
Daniel R. Elliott, Ridgewood, and Edgar Francois, Wayne, N.J., and Kenneth Roebuck, Wakefield, R.I., assignors to United States Rubber Company, New York, N.Y., a corporation of New Jersey
Filed Dec. 24, 1962, Ser. No. 246,836
21 Claims. (Cl. 60—263)

The present invention relates to a method of reinforcing filament-wound chambers having multiple off-axis ports, and more particularly concerns the method of reinforcing such chambers with zonal windings.

Filament-wound structure comprising glass filament windings and epoxy resin binders are well known in the art and are described in copending United States patent application of Uhlig et al., Serial No. 36,396, filed June 15, 1960, now Patent No. 3,144,952, and in the Preprint Book of the 13th Annual Technical and Management Conference, Reinforced Plastics Division, Society of the Plastics Industry (Chicago, Ill., Feb. 4, 1958), sections 15B, C and D.

The distinctive feature of our mode of construction is the use of zones of filamentary reinforcements extending from each port in the direction of each adjacent port, the filaments thereof thus lying generally parallel to the circumferential line joining the centers of the ports and hence intersecting the annular port rings, in the neighborhood of the line of centers, at angles approaching right angles. These filamentary reinforcements are girth wound on a so-called zonal mandrel whose size and shape bear predetermined relations to the size and shape of the end of the chamber, sliced therefrom, and interleaved with the winding layers of the chamber.

The details of the present invention will become apparent from a perusal of the description thereof below in conjunction with an examination of the drawings in which:

FIG. 1 is a perspective view of a segment of a rocket motor case.

FIG. 2 is a cross-sectional view through an off-axis port along the line 2—2 of FIG. 1.

FIG. 3 is an orthogonal schematic of the types of windings on an end.

FIG. 4 is a diagram showing the design relation of a chamber end and a corresponding zonal mandrel.

Referring now to the drawings and in particular to FIG. 1, a typical filament-wound solid-propellant rocket motor case, consists of a cylindrical girth section 10 composed of girth windings 12 and at least one substantially closed, oblate end 14. The oblate end is approximately a surface of revolution of oblate form, such as an oblate ovaloid or an oblate ellipsoid, etc. The exact form is determined primarily by the ratio of the polar opening radius to the girth radius—as will be explained later—smaller ratios dictating stubbier, more oblate ends. The case usually has at least one axial (polar) opening 18 to enable mounting the case on the filament-winding apparatus. A simple chamber with two polar openings can then be completed by inserting a plug in one polar opening and attaching a nozzle in the other. However, in most large booster engines, at least one end 14 of the case has multiple circumferentially-arranged nozzle ports 16 located off the chamber axis, in addition to the polar opening 18.

The case structure consists of reinforced glass filaments embedded in and bonded together by an epoxy resin matrix. The filaments offers an advantage in that they can be oriented in such a manner as to exactly equalize the strains at all points in the chamber walls. The structure consists of approximately 80% glass and 20% epoxy resin, by weight. The goal of any design is to produce a case which has the lightest weight for a given volume and operating pressure, and in which the end walls are reinforced in such a way that the strains therein are uniform in all directions.

In the cylindrical portion of a rocket motor case, the ratio of the circumferential stresses to the axial stresses is mathematically equal to 2:1. In the structure shown, the circumferential stresses are borne primarily by girth windings 12 of closely spaced filaments helically wound at a low pitch to form a high angle with the case axis. The axial stresses are borne primarily by end-over-end axial windings 34 of filaments lying roughly longitudinally along the axis. This winding pattern is that disclosed in the aforesaid Uhlig et al. application. Because of the polar openings, the axial filaments must be wound no closer to the axis than the circular perimeters of the polar openings, resulting in the axial plies being wound at a low angle with respect to the axis of the case. For any given rocket motor case with a cylindrical girth section of radius $r$, the greater the radius $r_0$ of the polar fitting, the greater is the angle formed between the axial windings and the axis of the case, and the more nearly hemispherical is the end contour. The creation of this axial winding angle results in circumferential stress upon pressurizing. Although tension on any angular axial winding produces some circumferential component of stress at every point of that winding in the oblate end, the circumferential stress component is usually relatively low near the cylindrical girth portion and increases as the polar opening is approached.

The introduction of multiple off-axis nozzle ports presents difficulty in attaining the isotensoid design well known in the art to be desirable. The port openings are most easily made by first applying axial windings as described, then anchoring the windings by means of annular reinforcements 36, called nozzle port rings, around each port, and finally cutting away the material of the windings within the intended port areas. (Ideally, the weight of glass necessary to reinforce the rim of the port is equal to the weight of glass removed in cutting out the port.)

Referring now to FIG. 2, the reinforcement of an off-axis port 16 is accomplished by placing around the metal port fitting 30 and over its inner-side flanges 32 a series of annular filamentary reinforcements, called nozzle port rings 36, having sufficient strength to take up all forces in the cut filament ends. The stresses in the cut filaments are transferred to the reinforcements by inter-ply (inter-laminar) shear. Currently available commercial resin laminates have inter-ply shear strength limited to a design level of less than 2000 p.s.i. Because of the low inter-ply shear strength available, the annular port rings are preferably added between layers of axial winding 34 as the chamber is being constructed in order to develop the required inter-ply stress transfer within the area of the reinforcement.

We have discovered that many of the difficulties encountered in operating with rocket motor cases having off-axis ports 16 reinforced with rings 36 result from the failure of these rings 36 to retain their original circular shape when the case is pressurized. In use the nozzle port rings 36 are not in equilibrium, but are tensilely stressed by and in the direction of the axial filaments. Under this stress the rings have a tendency to deviate from their original annular circular shape and to become distorted into axially oblong or elliptical shapes because of the imbalance of forces acting on them.

We have experimented to determine the most efficient reinforcements which may connect said off-axis ports and distribute circumferential stresses as necessary to balance the axial stresses so as to maintain the rings in equilibrium and therefore circular. High-angle windings were used, but these required a more nearly hemispherical end contour rather than the desired oblate end contour. Furthermore, the high-angle produced in the cylindrical girth portion cause many cross-overs, which decrease the axial strength level throughout the length of the cylinder.

We have also experimented with plying-up reinforcing materials between the ports. Woven fabric adds strength in the axial direction where it is not needed. This woven type of reinforcement introduces undesirable axial stress components. Geometric difficulties are encountered in applying a flexible, flat planar reinforcement (cloth or mat, woven or non-woven) on a surface curved in two directions. The end contour slopes in both the axial and the circumferential directions. Any planar layer of reinforcing material necessarily will buckle when forced to conform to the curved end contour. This buckling or bunching of material is undesirable as it not only irregularly distorts the surface contour of the end, but also interferes with inter-ply stress transfer between the reinforced and reinforcing materials. Another major disadvantage resulting from the geometry of the situation is that the effective width of any flat, say trapezoidal, reinforcement is less than its actual width. Considering now FIG. 3, which shows four off-axis ports 16 of considerable diameter spaced 90° apart from each other, it is obvious that (1) the parts 20 of these ports 16, which are farthest away from the polar opening 18, cannot be connected in the figure by a straight line without passing through a portion of each off-axis port 16, and (2) the parts 22 of these ports, which are closest to the polar opening 18, cannot be connected in the figure by a straight line without coming close to or actually passing through the polar opening 18. To produce the necessary lateral reinforcement for the rings 36 it is therefore necessary to use a planar reinforcement (preferably trapezoidal in shape) which is much wider than the diameter of the rings 36. Although the segments of the reinforcement covering the ports will later be cut away, the extra width results in an undesirable increase in the critical weight factor, We found that a reinforcement having filaments which substantially followed the principal lines of circumferential tensile stress in the end (the lines—parallels of latitude—running in planes perpendicular to the case axis) would be most efficient. Such a reinforcement utilizes the full potential tensile strength of all filaments and has an effective width equal to its actual width. However, the axial curvature of an oblate end makes it physically impossible to wind such a reinforcement on the end under tension without introducing measures designed to prevent slippage of the windings. The winding tension on the filaments tends to displace the filaments along the surface toward the center port. Where the tangent to the end contour near the polar opening closely approaches a perpendicular to the case axis, the tension on the filament being wound will cause it to slip. Anti-slippage measures would be so complex as to make the reinforcement impractical. The filaments desirably are wound under tension for compactness and the elimination of voids.

This invention provides chambers with strengthened off-axis nozzle port rings and provides a process for strengthening such port rings with reinforcements which possess maximum tensile strength for the number of filaments used because the tensile strength of all the filaments is utilized, which distort the oblateness of the end contour less than high-angle axial helical windings, which avoid the introduction of weakening axial winding cross-overs along the cylindrical portion, which provide strength primarily in the circumferential direction rather than in the axial direction, which possess circular symmetry to simplify stress calculations, which have an effective width equal to their actual width, which may be applied to an end contour with a minimum of bulging or bunching of the reinforcing material, which minimize the increase in critical weight-to-strength ratio, and which reduce manufacturing costs below prior reinforcements such as glass fabric.

The present invention comprises a method of reinforcing multiple annular port rings with an efficient reinforcement which distributes circumferential stresses so as to maintain the rings in equilibrium. More particularly, the present invention comprises connecting the left half of one port ring to the right half of another by filaments, called zonal windings or zonals 40, lying along latitudinally-extending principal lines of circumferential stress, whereby the stress in a ring in one direction is transmitted through the zonal and acts to balance the oppositely-directed stress in the other ring.

The zonals 40, like the rocket case, are made from continuous parallel glass filaments embedded in an epoxy resin binder. The resin binder is dried and partially cured before removal of the zonal windings from the zonal mandrel to facilitate handling. The cure to obtain maximum viscosity is completed in situ with the later curing of the rocket case.

The zonals are wound under customary winding tension on a zonal mandrel just as the girth windings 12 of a simple rocket case are customarily wound on the cylindrical portion of a rocket case mandrel. The zonal mandrel may be made of metal or any other standard mandrel composition, e.g., wood, aluminum, metal surrounded by a layer of plaster, etc. To facilitate stripping of the completed zonal from the mandrel, a thin layer of polyethylene is applied immediately over the mandrel before the winding. To assist in removal of the zonal and maintenance of its shape during storage, a thin layer of cloth is preferably applied over the polyethylene before winding is commenced. Immediately after filament-winding of the zonal, the layers, in successive order from the inside out, are the mandrel material, the polyethylene, the cloth and the zonal. The zonal and cloth layers may then be cut across the band of filaments, preferably perpendicular to the filaments and along the mandrel axis, and removed as a unit for cold storage until the zonal is to be applied. The cloth supporting layer helps the sticky, flexible resin maintain the filaments in fixed relative position after the winding tension has been released because of cutting and removal of the zonal from the mandrel.

The advantages for filament-winding offered by the zonal mandrel over the end contour are (1) a more linear axial contour, and (2) an axial tangent to the zonal contour which forms a smaller angle with the mandrel axis in the polar region. Therefore the mandrel may be filament-wound under tension, as is both customary and desirable in winding operations. The zonal mandrel may be defined dimensionally as a mandrel having the following properties relative to the end segment to which the zonal will be applied: (1) each of its latitudinal radii is approximately half the length of the corresponding latitudinal radius on the end segment, and (2) the length along each geodesic axial curve on the zonal mandrel is equal to the length along the corresponding geodesic axial curve on the end segment. The zonal wound on such a mandrel is curved both circumferentially and axially, as is the end contour. A more complete definition of the design relationship between the zonal mandrel and the end contour will become apparent from a perusal of FIG. 4 in conjunction with the following detailed design procedure for the fabrication of a zonal mandrel.

*Zonal mandrel design procedure*

FIG. 4 is a scale drawing of an axial cross-section contour through one-half an end for an actual casing, which appears above the line A—A, together with a scale drawing of an axial cross-section contour through one-half of a zonal mandrel, which appears below the line A—A. However, the axis of the casing contour is vertical in FIG. 4 (along the line X—X) whereas the corresponding axis of the zonal mandrel is horizontal in FIG. 4 (along the line A—A).

In this casing the distance between points 1 and 22 measured on the ovaloid end was $21^{15}/_{16}''$.

(1) Establish points #1 and #22 on an ovaloid (oblate) curve corresponding to the end contour of the end of the vessel in the region of the ports to which the zonal mat will be applied.

(2) Subdivide the distance alonge the curve between points #1 and #22 into a predetermined number of equal arcs. (In this case twenty-one such arcs, and the resulting arc length of 1.044″ along the curve, were chosen as a compromise between convenience and precision.)

(3) Project lines parallel to line Y—Y ("Y" co-ordinate lines) from each of points #1 to #22 inclusive until they intersect the line marked X—X, corresponding to the axis of the vessel. Number these "Y" co-ordinate lines, corresponding to the latitudinal radii of the end, where they intersect line X—X to correspond with the numbers spaced along the ovaloid curve.

(4) Proceed to lay out a zonal mandrel contour (curve) by drawing horizontal line A—A, corresponding to the axis of center line of the zonal mandrel. From horizontal center line A—A measure down on perpendicular line X—X a length (12¼″) equal to one-half the measured length (24½″) of "Y" co-ordinate #22. This distance establishes the zonal radius at the wide end of the zonal mandrel. Starting at the center line A—A, point off on line X—X a length ($2^{11}/_{16}''$) equal to one-half the measured length (5⅜″) of "Y" co-ordinate #1. This distance establishes the zonal radius at the narrow end of the zonal mandrel. Follow this procedure for points #2 through #21, until all twenty-two vertical zonal coordinates are established. Number each point measured off with the corresponding "Y" co-ordinate number. To plot zonal co-ordinates, start spacing of same by swinging an arc having the same radius as the curve arcs (1.044″) from zonal point #22 (measured down 12¼″ from center line A—A along X—X). Draw horizontal zonal co-ordinate #21 to intersect the scribed zonal arc. From this point of intersection scribe a similar arc and draw horizontal zonal co-ordinate #20 to intersect this scribed arc. Follow this procedure for points #20 through #1, until all twenty-one intersection points and horizontal zonal co-ordinates are established. Connect all points established by the intersection of horizontal co-ordinates with arcs, using a French curve for this purpose. The resulting curved line establishes the face contour of the zonal mandrel. The length ($21^{15}/_{16}''$) along this curved line will equal the length along the curved line between points #1 and #22 spaced off on the ovaloid end contour.

The unfolded radius of a cone (from the apex to the base) is equal in length to the latitudinal radius of the surface upon which the cone will smoothly lie when sliced and opened. It may be noted that the zonal mandrel face contour approximates a straight line and thereby roughly forms a truncated cone. The distance from any point on the zonal mandrel face to an imaginary apex (the unfolded radius of the zonal mandrel cone) will therefore approximate the latitudinal radius of the end contour at a corresponding point.

Each application of the zonals effects a slight change in the contour (or curve) and size of the chamber due to the thickness of the zonal which must be compensated for in the production of subsequent zonals for that region by an adjustment in the dimensions of the zonal mandrel. Minute discrepancies in the shape of the end contour are of only slight consequence as the flexible nature of the incompletely cured zonal winding material allows adjustment to the contour surface variations without causing noticeable buckling.

Depending on the inter-ply shear strengths of the materials, it is usually desirable that contiguous zonals overlap one another slightly (preferably 3 inches) above and below the ports to enable them to act as a continuous unit by virtue of the inter-ply shear strength. This requires an adjustment in the dimensions of the zonal mandrel. To obtain an overlap of Z inches, the length of each old zonal radius R (calculated in paragraph 4 above) is increased to obtain the new zonal radius R′ by the following formula:

$$\frac{2\pi R + Z}{2\pi} = R'$$

It is desirable that the ends of non-over-lapping zonals or the center of the overlap of over-lapping zonals be aligned along the center lines 20–22 of the ports 16 (so that filaments of the axially sliced zonal windings are aligned along the latitudinal principal lines of circumferential stress) rather than between the ports, although the latter is also workable in certain instances. The zonals are preferably spaced at 90° or 180° intervals around the end.

A smoother end contour and a greater area available for inter-ply stress transfer are obtained if the zonals are applied at various stages of the filament-winding, rather than being massed together and applied at one stage only. For example, one might preferably construct an end composed of a number of layers in the sequence demonstrated in FIG. 3: axial windings 34, rings 36, zonals 40, rings 36, axial windings 34, rings 36, zonals 40, rings 36, etc. The zonals are best utilized when a single layer of two zonals (or a two layer laminate of four zonals) is adjacent to at least one layer (sandwiched between two layers) of rings so that the zonals, in a sense, become a part of the rings which they overlap because of the large area available for inter-ply shear transfer.

In one embodiment, the zonals may be wound at a rather low density and applied in sets of four, each zonal commencing 90° ahead of the other and extending over half of the circumference of the end to be covered. This results in two layers of zonals, each layer covering the end circumference once. Port rings surround each set of four zonals so that each layer contacts a port ring, either above or below, and transfers its stress thereinto.

Because the end is not hemispherical and the circumferential stress at a point on the oblate end is therefore a function of the geodesic distance of the point from the polar opening, it may be desirable to have a greater or lesser number of strength-providing filaments per unit width depending upon the particular circumferential stress to be expected at the location of the point. This may be accomplished by spinning the zonal windings on the zonal mandrel in a more or less dense relationship (number of filaments per unit axial length) at various points along the axis of the zonal mandrel. It is preferable, however, to divide the axial length of the port rings into concentric areas and apply to each narrow zonals, applying denser zonals 38A to the zones of greatest stress farthest from the polar opening, and less dense zonals 38B to the zones of lesser stress nearest the polar opening. (The axial winds cut almost tangentially across the port rings near the polar opening and act as reinforcements to reduce the circumferential stress at the points thereof nearest the polar opening 18.)

When a zonal is designed to have a width equal to that of the port rings, the effective width of the zonal (a width useful in maintaining the shape of the rings) is equal to its actual width. If desired, extra zonals may be placed above and below the width of the port rings to add extra strength to the end or maintain a smooth end contour (say, in lieu of nylon or glass filament filler).

Because the zonal windings follow the circumferential stress patterns of the end, a symmetry of stresses is maintained which permits rather precise calculation of the end stresses on a circular stress field assumption. Furthermore, the full potential strength of the glass filaments is utilized and the effective width of the zonal winding corresponds to its actual width. As the zonal connects the left side of one port ring to the right side of another port ring and the circumferential stresses on the two sides are opposed in direction, the zonal balances the one stress against the other. Transmission of the stresses is primarily through the glass filaments of the zonal which naturally tend to remain in position as they already follow the latitudinally-directed principal lines of circumferential stress on the end.

Having thus described our invention, what we claim and desire to protect by Letters Patent is:

1. A method of reinforcing multiple off-axis ports on an oblate end comprising the steps of
   (1) filament-winding a zonal on a zonal mandrel having latitudinal radii lengths in predetermined fixed proportion to the corresponding latitudinal radii lengths on the end and having geodesic axial curves equal in length to the corresponding geodesic axial curves on the end;
   (2) opening and removing the zonal therefrom;
   (3) applying the zonal between two of said ports on the end with the filaments following the latitudinally-extending principal lines of circumferential stress; whereby the zonal has a surface shaped substantially the same as the corresponding end portion so as to lie smoothly thereon.

2. The method of claim 1 wherein said zonal is applied in step (3) overlapping at least one other zonal.

3. The method of claim 1 wherein said zonal is applied in step (3) with a portion of one end overlapping one end of another zonal in the region around one of said off-axis ports.

4. The method of claim 1 wherein said zonal is applied in step (3) with one end contacting one of said ports and the other end contacting an opposite one of said ports.

5. The method of claim 1 wherein the ratio of the latitudinal radii of said zonal mandrel of step (1) to the latitudinal radii of said end is 1:2.

6. The method of claim 1 wherein the ratio of the latitudinal radii of said zonal mandrel of step (2) to the latitudinal radii R of said end is $$\frac{\pi R + Z}{2\pi} : R$$

wherein Z is the length of zonal overlap.

7. The method of claim 1 wherein the relationship of the contour of said zonal mandrel of step (1) to the contour of said end is that shown and described in FIG. 4.

8. The method of claim 1 wherein said zonal is sliced axially in step (2).

9. The method of claim 1 wherein said zonal is filament-wound in step (1) under tension.

10. The method of claim 1 wherein said zonal is opened in step (2) by slicing said zonal at less than a right angle to the axis of the zonal mandrel.

11. In a chamber having multiple off-axis ports and port reinforcement rings circumferentially arranged on a substantially closed oblate end, the improvement comprising a filament-wound zonal reinforcement having filaments connecting said rings along the latitudinally-extending principal lines of circumferential stress, whereby said zonal reinforcement has a surface shaped substantially the same as the corresponding end portion so as to lie smoothly thereon.

12. In a chamber having multiple off-axis ports and port reinforcement rings circumferentially arranged on a substantially closed oblate end, the improvement comprising a filament-wound zonal reinforcement, which, before removal from a zonal mandrel, has a tensioned surface shaped substantially the same as the corresponding portion of a zonal mandrel having latitudinal radii lengths in predetermined fixed proportion to the corresponding latitudinal radii lengths on the end and geodesic axial curves equal in length to the corresponding geodesic axial curves on the end, and which, as it lies on the end, has filaments connecting said rings along the latitudinally-extending principal lines of circumferential stress so as to present a surface shaped substantially the same as the corresponding end portion and lie smoothly thereon.

13. The improvement of claim 12 wherein said zonal reinforcement is overlapping at least one other zonal reinforcement.

14. The improvement of claim 12 wherein said zonal reinforcement has a portion of one end overlapping one end of another zonal reinforcement in the region around one of said off-axis ports.

15. The improvement of claim 12 wherein said zonal reinforcement has one end contacting one of said port reinforcement rings and the other end contacting an opposite one of said port reinforcement rings.

16. The improvement of claim 12 wherein the ratio of the latitudinal radii of said zonal mandrel to the latitudinal radii of said end is 1:2.

17. The improvement of claim 13 wherein the ratio of the latitudinal radii of said zonal mandrel to the latitudinal radii R of said end is $$\frac{\pi R + Z}{2\pi} : R$$

wherein Z is the length by which the zonal reinforcements overlap one another.

18. The improvement of claim 12 wherein the relationship of the contour of said zonal mandrel to the contour of said end is that shown and described in FIG. 4.

19. In a chamber having multiple off-axis ports circumferentially arranged on a substantially closed oblate end, the improvement comprising a filament-wound zonal reinforcement having a shape substantially the same as the corresponding end portion so as to lie smoothly thereon and filaments connecting said ports along the latitudinally-extending principal lines of circumferential stress; said zonal reinforcement being the sliced and opened product of a substantially conical shape, the unfolded radii of said conical shape being substantially equal to the latitudinal radii of the end.

20. A filament-wound zonal reinforcement for reinforcing multiple off-axis ports on an oblate end, wherein the closed conical shape of said zonal defines latitudinal radii lengths in predetermined fixed proportion to the corresponding latitudinal radii lengths on the end and has geodesic axial curves equal in length to the corresponding geodesic axial curves on the end, and wherein the opened shape of said zonal, when said zonal is connecting two of said ports on the end with the filaments following the latitudinally-extending principal lines of circumferential stress, is substantially the same as the corresponding end portion so as to lie smoothly thereon.

21. A method of reinforcing a plurality of off-axis port rings the respective centers of which are located on a circumference of an oblate end, said method comprising connecting adjacent portions of the respective circumferences of adjacent port rings by a plurality of filament segments each lying generally parallel to that circumference of the said oblate end which joins the centers of the said adjacent port rings.

References Cited by the Examiner
UNITED STATES PATENTS

| | | | |
|---|---|---|---|
| 2,749,266 | 6/1956 | Eldred | 156—173 |
| 2,964,439 | 12/1960 | Modigliani | 156—173 |
| 3,027,709 | 4/1962 | Welder | 60—35.6 |
| 3,048,970 | 8/1962 | Herzog | 60—35.6 |
| 3,115,271 | 12/1963 | Anderson et al. | 220—83 |

MARK NEWMAN, *Primary Examiner.*

EARL M. BERGERT, CARLTON R. CROYLE,
*Examiners*

P. DIER, *Assistant Examiner.*